United States Patent
Kim

(10) Patent No.: US 7,551,692 B2
(45) Date of Patent: Jun. 23, 2009

(54) FREQUENCY RECOVERY APPARATUS AND METHOD FOR USE IN DIGITAL BROADCAST RECEIVER

(75) Inventor: Tae Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 645 days.

(21) Appl. No.: 11/226,288

(22) Filed: Sep. 15, 2005

(65) Prior Publication Data

US 2006/0062316 A1 Mar. 23, 2006

(30) Foreign Application Priority Data

Sep. 17, 2004 (KR) .................. 10-2004-0074475

(51) Int. Cl.
*H04L 27/00* (2006.01)
(52) U.S. Cl. .................. 375/326; 375/142; 375/150; 375/262; 375/341; 375/342
(58) Field of Classification Search .................. 375/326, 375/142, 150, 262, 341, 343
See application file for complete search history.

(56) References Cited

U.S. PATENT DOCUMENTS 6,628,730 B1 9/2003 Stott et al.
2004/0179625 A1 9/2004 Kim
2007/0036231 A1* 2/2007 Ido .......................... 375/260

FOREIGN PATENT DOCUMENTS

CN 1346186 A 4/2002
EP 1 195 961 A2 4/2002

OTHER PUBLICATIONS

Hanzo et al., "Single- and Multi-carrier Quadrature Amplitute Modulation," pp. 521-534, (2000), XP-002453970.

* cited by examiner

*Primary Examiner*—Shuwang Liu
*Assistant Examiner*—Kabir A Timory
(74) *Attorney, Agent, or Firm*—Birch, Stewart, Kolasch & Birch, LLP

(57) ABSTRACT

A frequency recovery device and method, the method including a) dividing first data units and corresponding second data units delayed by time intervals, passing only parts of the data units from among the divided data units in the divided intervals, dividing the first and the second data units into four parts each having a 2k-mode interval size, passing each part and the data units contained in a predetermined-sized pull-in range interval positioned at front and rear parts of the data interval, allowing the remaining data to be padded to zero, and generating the padding result; b) generating pilot patterns in the divided data units; c) performing correlation between the padding results of the first and second data units at individual positions of the generated pilot patterns, and generating correlation values; and d) estimating a maximum correlation value from among the correlation values as a frequency offset.

14 Claims, 5 Drawing Sheets

FIG. 2

| Continual pilot carrier positions (index number k) | |
|---|---|
| 2k mode | 8k mode |
| 0 48 54 87 141 156 192 201 255 279 282 333 432 450 483 525 531 618 636 714 759 765 780 804 873 888 918 939 942 969 984 1050 1101 1107 1110 1137 1140 1146 1206 1269 1323 1377 1491 1683 1704 | 0 48 54 87 141 156 192 201 255 279 282 333 432 450 483 525 531 618 636 714 759 765 780 804 873 888 918 939 942 969 984 1050 1101 1107 1110 1137 1140 1146 1206 1269 1323 1377 1491 1683 1704 1752 1758 1791 1845 1860 1896 1905 1959 1983 1986 2037 2136 2154 2187 2229 2235 2322 2340 2418 2463 2469 2484 2508 2577 2592 2622 2643 2646 2673 2688 2754 2805 2811 2814 2841 2844 2850 2910 2973 3027 3081 3195 3387 3408 3456 3462 3495 3549 3564 3600 3609 3663 3687 3680 3741 3840 3858 3851 3933 3939 4026 4044 4122 4167 4173 4188 4212 4281 4296 4326 4347 4350 4377 4932 4458 4509 4515 4518 4545 4548 4554 4614 4677 4737 4785 4899 5091 5112 5160 5166 5199 6253 5268 5304 5313 5367 5391 5394 5445 5544 5562 5595 5637 5643 5730 5748 5826 5871 5877 5892 5916 5985 6000 6030 6051 6054 6081 6096 6162 6213 6219 6222 6249 6252 6258 6318 6381 6435 6489 6603 6795 6816 |

FREQUENCY RECOVERY APPARATUS AND METHOD FOR USE IN DIGITAL BROADCAST RECEIVER

This application claims the benefit of Korean Patent Application No. P04-0074475, filed on Sep. 17, 2004, which is hereby incorporated by reference as if fully set forth herein.

BACKGROUND OF THE INVENTION

1. Field of the Invention

The present invention relates to a frequency recovery apparatus and method for use in a digital broadcast receiver, and more particularly to a coarse frequency recovery apparatus and method which has very strong resistance to a sampling offset in a Digital Video Broadcasting-Terrestrial (DVB-T) broadcast receiver.

2. Discussion of the Related Art

Generally, a DVB-T broadcast system can perform data transmission/reception using an Orthogonal Frequency Division Multiplexing (OFDM) scheme.

According to the basic principles of the above-mentioned OFDM scheme, a data stream having a high transfer rate is divided into a plurality of data streams, each of which has a low transfer rate, and the divided data streams are simultaneously transmitted using a plurality of sub-carriers.

The above-mentioned OFDM scheme has been widely used to transmit/receive broadcast signals due to a variety of advantages, the most important of which is that broadcast signals based on the OFDM scheme have very strong resistance to either frequency selective fading or narrowband interference.

A plurality of carrier systems can be efficiently implemented using an Inverse Fast Fourier Transform (IFFT) based on orthogonality among a plurality of carriers.

An OFDM receiver basically performs a carrier recovery operation to synchronize a desired signal. A frequency synchronization operation allows a Radio Frequency (RF) carrier frequency of a transmitter to coincide with that of a receiver.

The difference between carrier frequencies of the transmitter and the receiver is referred to as "frequency offset". The OFDM scheme has very weak resistance to the frequency offset.

The frequency offset incurs two serious problems in a signal transmitted according to the OFDM scheme. One problem is that the magnitude of a signal transmitted via individual sub-carriers decreases when the signal is demodulated using a Fast Fourier Transform (FFT) process. The other problem is that orthogonality between sub-carriers is no longer maintained due to the occurrence of Inter-Carrier Interference (ICI).

In other words, the OFDM scheme has a relatively narrow frequency interval between sub-carriers as compared to a transmission band, such that the sub-carriers may be greatly affected by a small frequency offset.

Therefore, when transmitting/receiving a desired signal according to the OFDM scheme, the frequency synchronization technology can be considered to be one of important technologies capable of improving performance of the OFDM receiver.

The OFDM scheme controls the frequency synchronization action to be operated in two modes. The above-mentioned two modes are a coarse frequency synchronization mode and a fine frequency synchronization mode.

The coarse frequency synchronization mode estimates an integer multiple of a sub-carrier interval closest to an initial frequency offset, and compensates for the estimated result.

The fine frequency synchronization mode estimates a frequency offset lower than half of an interval between neighboring sub-carriers, and compensates for a frequency on the basis of the estimated frequency offset.

In other words, the coarse frequency synchronization method can allow an initial frequency offset of higher than the sub-carrier interval to be reduced to half of the sub-carrier interval or less. The frequency offset reduced to half of the sub-carrier interval or less can be compensated for using the fine frequency synchronization method.

As described above, the coarse frequency synchronization method must estimate an integer multiple of the sub-carrier interval closest to the initial frequency offset. A basic configuration of the above-mentioned coarse frequency offset estimator is shown in FIG. 1.

FIG. 1 is a block diagram illustrating a conventional coarse frequency offset estimator.

The coarse frequency estimator shown in FIG. 1 performs correlation between FFT output signals and the delayed results of the FFT output signals, such that it determines a changed value of a predetermined pilot pattern, at which the maximum corresponding value is generated, to be a coarse frequency offset.

In order to determine the above-mentioned coarse frequency offset, a pilot pattern generator 121 generates 45 pilot patterns at a 2k mode, and generates 175 pilot patterns at an 8k mode. The pilot pattern generator 121 generates the remaining values other than the pilot patterns with padding values of zeros at the 2k mode or at the 8k mode.

Using continual pilot informations generated from the pilot pattern generator 121, current symbols generated from the FFT unit 107, and one-symbol-delayed symbols generated from the delay 117 are correlated in a cross-correlator 119, such that their correlation results are generated from the cross-correlator 119.

An estimator 115 receives output values of the correlator 119, tracks a maximum value from among a plurality of correlation values contained in a data interval, and estimates a coarse frequency offset using position information of the maximum value.

The above-mentioned frequency offset is generated because a frequency of a received signal passing through the FFT unit 107 moves on a frequency domain. If there is no frequency offset, the maximum value from among the correlation values is generated at a specific position at which a data interval is terminated.

Therefore, the coarse frequency offset can be estimated according to variations of the maximum value position.

An accumulator 113 shown in FIG. 1 compensates for the coarse frequency offset acquired by the above-mentioned estimation process.

If a sampling clock offset is generated before the above-mentioned coarse frequency offset estimation method, and the generated sampling clock offset passes through the FFT unit 107, the FFT unit 107 converts the sampling clock offset into a phase variation value, such that the phase variation value has a negative influence upon the coarse frequency offset estimation result.

In other words, generally, if the sampling clock offset is 100 ppm, a single sample is inserted or omitted at intervals of a predetermined distance corresponding to four symbols in the 2k mode. In the case of the 8k mode, a single sample is inserted or omitted at intervals of a predetermined distance corresponding to a single symbol.

Therefore, a frequency offset is slightly robust to the sampling clock offset at the 2k mode, but it has very weak resistance to the sampling clock offset at the 2k mode.

In other words, the apparatus of the above-mentioned conventional coarse frequency offset estimation and the method thereof has more difficulty in estimating the frequency offset in the 8k mode than in the 2k mode under a predetermined sampling clock offset environment (e.g., if the sampling clock offset is 100 ppm).

SUMMARY OF THE INVENTION

Accordingly, the present invention is directed to a frequency recovery apparatus and method for use in a digital broadcast receiver that substantially obviates one or more problems due to limitations and disadvantages of the related art.

An object of the present invention is to provide an apparatus and method for estimating a coarse frequency offset, which can more correctly estimate a frequency offset regardless of a mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a frequency recovery apparatus for use in a digital broadcast receiver for receiving a digital broadcast signal transmitted according to an orthogonal frequency division multiplexing (OFDM) scheme, comprises: a division window for dividing first data units, which are transformed from OFDM symbols into frequency-domain values and the second data units which the first data units are delayed by some intervals respectively, generating divided data units, and passing only some data units from among the divided data units; a pilot pattern generator for generating a pilot pattern associated with data units contained in each of the divided windows; and a cross-correlator for performing correlation between the first data units and the second data units at a individual position of the pilot pattern generated from the pilot pattern generator, and generating the correlation resultant values.

Preferably, the OFDM symbols are the symbols in an 8k mode.

Preferably, the frequency-domain values are performed by a Fast Fouier Transform operation.

Preferably, the second data units are the data, which the first data units are delayed by a single OFDM-symbol interval Preferably, the division window passes only first data units divided into a predetermined-sized data interval, and second data units of a predetermined-sized pull-in range interval positioned at front and rear parts of the divided data interval, allows data of the remaining intervals other than the first and second data units to be padded to zero, and generates the padding results.

Preferably, the predetermined-sized data interval has a 2k-mode interval size.

Preferably, the size of the pull-in range interval is indicative of a predetermined size corresponding to 170 data units.

Preferably, the division window comprises four windows, each of which divides a data interval of the 8k mode into data intervals each having a 2k-mode data interval size.

Preferably, the pilot pattern generator comprises four pattern generators, each of which generates pilot patterns associated with the 2k-mode-interval-sized data interval from among the 8k-mode data units, respectively.

Preferably, the cross-correlator comprises four correlator, each of which performs cross-correlation between output data of a single window capable of generating the 2k-mode-interval-sized data interval from among the 8k-mode data units and delayed data of the output data of the single window.

Preferably, the frequency recovery apparatus for use in the digital broadcast receiver further comprises: an estimator for generating a maximum cross-correlation value from among cross-correlation values generated from the four cross-correlators.

In another aspect of the present invention, there is provided a frequency recovery method for a digital broadcast signal transmitted according to an orthogonal frequency division multiplexing (OFDM) scheme, comprising the steps of: a) dividing first data units, which are transformed from OFDM symbols into frequency-domain values and the second data units which the first data units are delays by some intervals respectively, passing only some data units from among the divided data units, allowing the remaining data to be padded to zero, and generating the padding result; b) generating pilot patterns associated with the divided data intervals; c) performing correlation between the padding result of the first data units and the padding result of the second data units at individual positions of the generated pilot patterns associated with the divided data intervals, and generating correlation values; and d) estimating a maximum correlation value from among the correlation values as a frequency offset It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 shows general continual pilot positions;

DETAILED DESCRIPTION OF THE INVENTION

Reference will now be made in detail to the preferred embodiments of the present invention, examples of which are illustrated in the accompanying drawings.

FIG. 2 shows sub-carrier positions corresponding to continual pilots within a single symbol, which is defined as 1705 samples at the 2k mode and is defined as 6817 samples at the 8k mode.

As shown in FIG. 2, 45 pilot patterns are generated in the 2k mode, and 175 pilot patterns are generated in the 8k mode.

However, in fact, zeroes are inserted into a part of the symbols, such that the data can be FFT/IFFT-processed. The inserted data interval is referred to as a guard band.

Therefore, the pilot patterns are contained in 2048 samples extended in the 2k mode, and in 8192 samples extended in the 8k mode.

Figure 1:
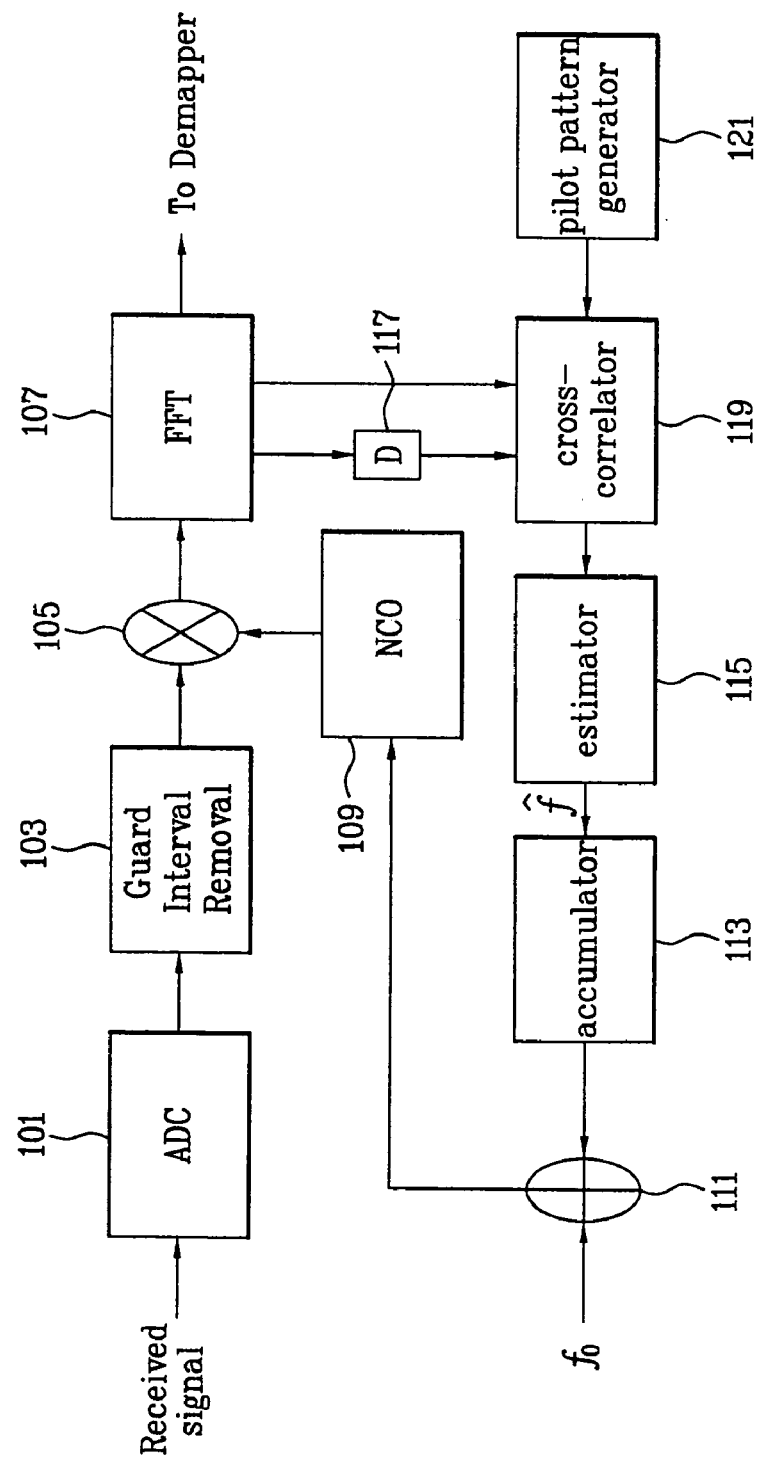
FIG. 1 is a block diagram illustrating a conventional coarse frequency offset.
Figure 3:
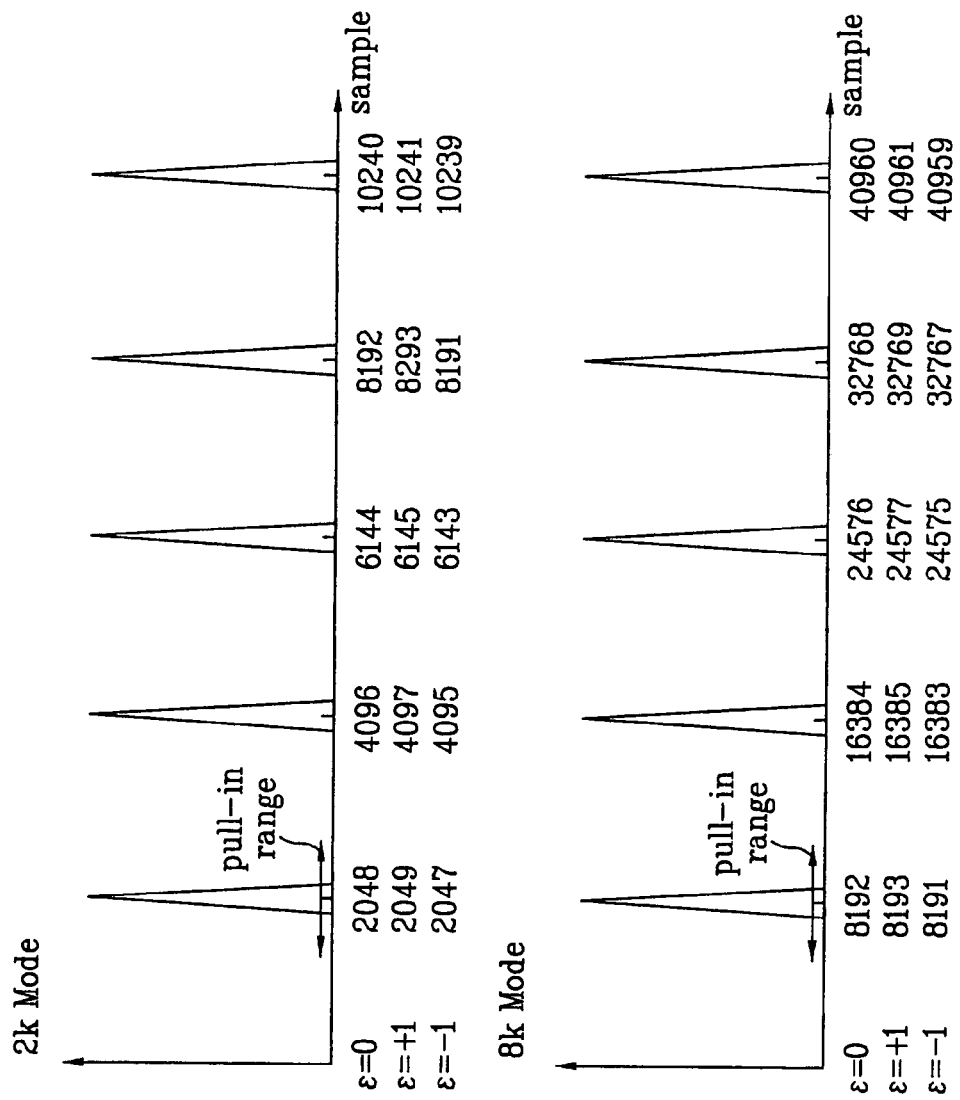
FIG. 3 shows output signals of a correlator associated with a frequency offset.

FIG. 3 shows output values of the above-mentioned cross-correlator associated with the frequency offset.

As can be seen from FIG. 3, if a relative frequency $\epsilon$ is zero, i.e., if there is no frequency offset, a correlation value reaches the maximum correlation value at a specific position at which a symbol is terminated.

However, if the frequency offset occurs, the position of the maximum correlation value is changed according to the frequency offset.

The relative frequency offset is indicative of a specific value calculated when an actual frequency offset is divided by a sub-carrier interval.

Figure 4:
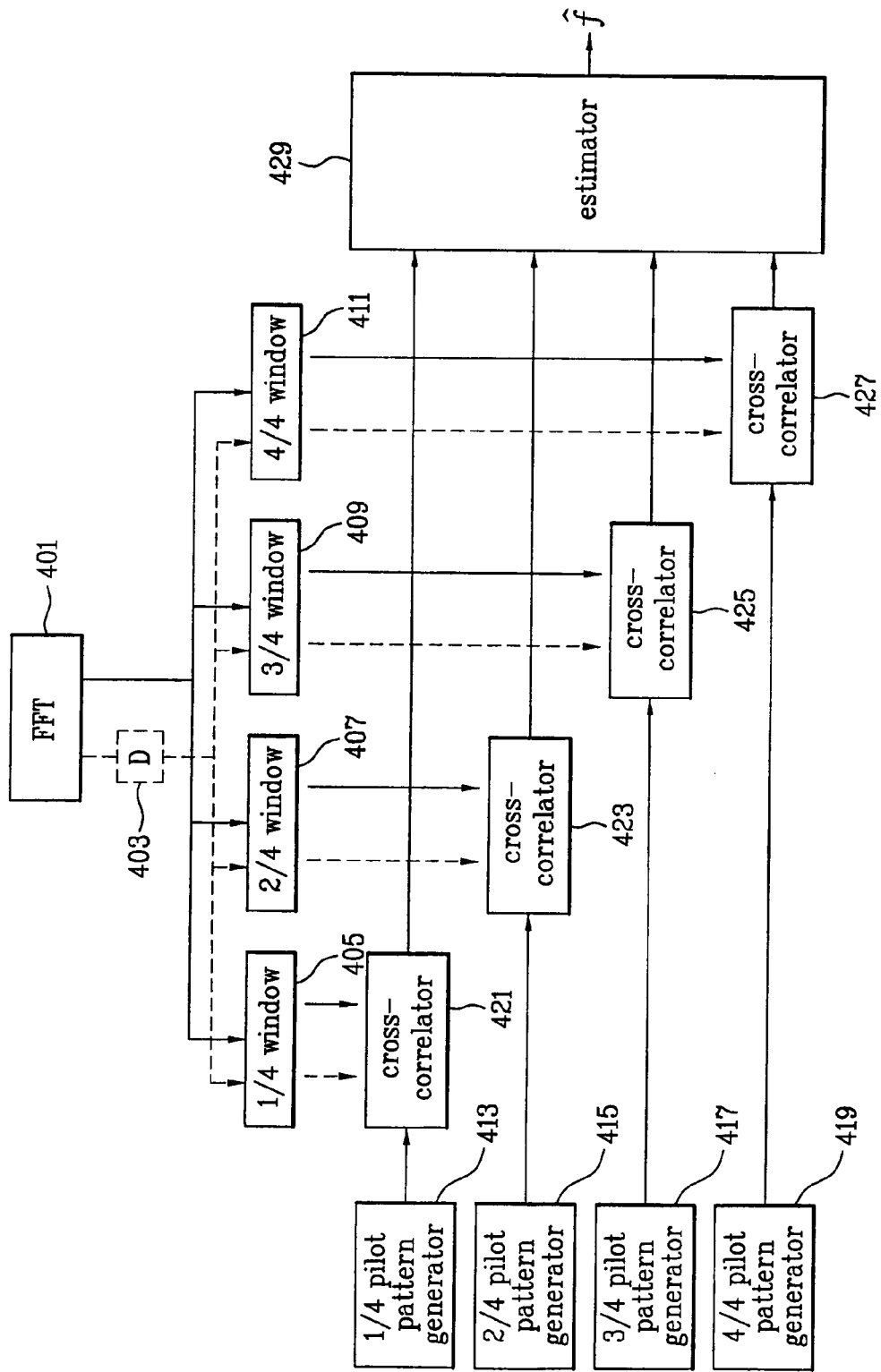
FIG. 4 is a block diagram illustrating a coarse frequency offset estimator in accordance with a preferred embodiment of the present invention.

FIG. 4 is a block diagram illustrating a coarse frequency offset estimator for use in a frequency recovery apparatus of a digital broadcast receiver in accordance with a preferred embodiment of the present invention.

The embodiment of a coarse frequency offset estimator will hereinafter be described with reference to FIG. 4.

As shown in FIG. 4, the embodiment of a coarse frequency offset estimator includes an FFT unit 401, a delay 403, four division windows 405, 407, 409, and 411, four division pilot pattern generators 413, 415, 417, and 419, four cross-correlators 421, 423, 425, and 427, and an estimator 429. The FFT unit 401 receives digital OFDM symbols, performs an FFT process on the received OFDM symbols, and converts the symbols into frequency-domain values. The delay 403 receives current data converted into frequency-domain values, and delays the received data by a single symbol interval. Each of the four division windows 405, 407, 409, and 411 receives the current data and the previous data having passed through the delay 403. In the 8k mode, each of the four division windows 405, 407, 409, and 411 passes 1705 data units (or 1704 data units) corresponding to a 2k-mode-data-interval and data units corresponding to a pull-in range, and the remaining data values to be padded to zero. In the 8k mode, each of the division pilot pattern generators 413, 415, 417, and 419 generates 45 pilot patterns (or 44 pilot patterns) corresponding to the 2k mode, and allows the remaining pilot patterns to be padded to zero. The cross-correlators 421, 423, 425, and 427 allow output values of the division windows 405, 407, 409, and 411 to be correlated with output values of the delay 403 at the positions of pilot patterns from the division pilot pattern generators 413, 415, 417, and 419, and finally generate correlation values. The estimator 429 estimates a coarse frequency offset using the maximum correlation value from among a plurality of division correlation values generated from the cross-correlators.

Operations of the above-mentioned embodiment of coarse frequency offset estimator according to the present invention will hereinafter be described.

The FFT unit 401 receives a plurality of 8k-mode OFDM symbols converted into digital values, performs a Fourier transform on the received OFDM symbols, and generates the resultant values.

In this case, if a frequency offset is present in the received OFDM symbols, the OFDM symbols incur a variation in frequency while passing through the FFT unit 401.

If data in a 8k-mode data interval, which are changed to frequency domain, and other data delayed by a single symbol interval passes through the division windows 405, 407, 409, and 411, 1705 data units (or 1704 data units) corresponding to the 2k mode from among the above-mentioned data contained in the intervals and data corresponding to the pull-in range pass through the above-mentioned windows, and the remaining data is filtered.

In this case, the pull-in range is indicative of a data interval arbitrarily set to track a position variation of the maximum correlation value at front and rear parts of data interval in the divided window. Generally, the pull-in range is set in the range from −170 to +170.

Figure 5:
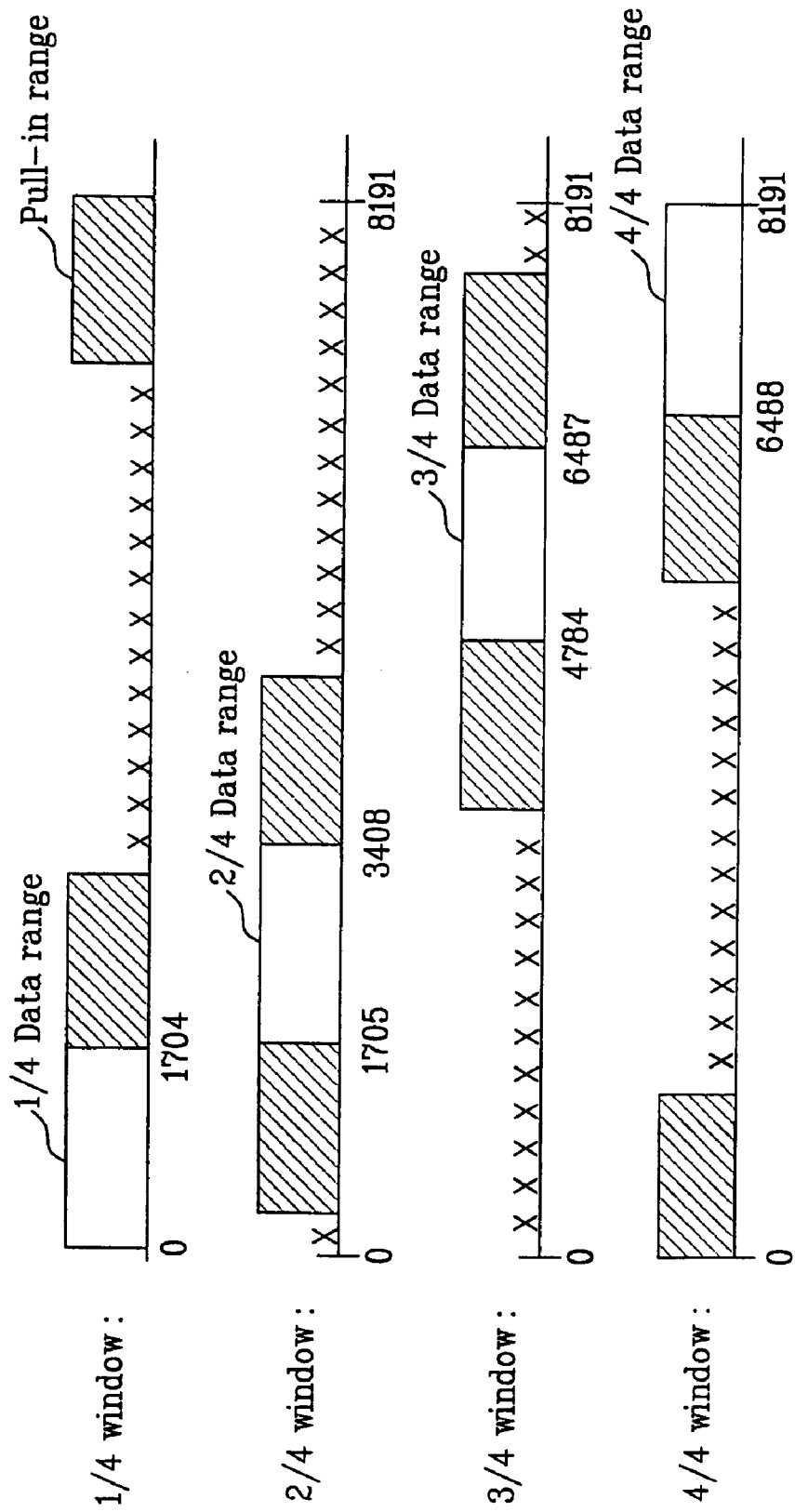
FIG. 5 shows exemplary division windows according to the present invention.

FIG. 5 shows exemplary division windows for use in a frequency recovery apparatus of a digital broadcast receiver according to the present invention. The range of data passing through the above-mentioned windows will hereinafter be described with reference to FIG. 5.

A single data interval defined as 8192 extended samples simultaneously with including a guard interval in the 8k mode is divided into a plurality of data intervals corresponding to four 2k modes and data intervals corresponding to the pull-in range.

A data interval (i.e., data from 0 to 1704) composed of 1705 samples corresponding to the 2k mode, and other data corresponding to the pull-in range present in the direction (±) of the data interval pass through a ¼ window denoted by 405 in FIG. 3. The data of the remaining intervals is padded to zero. The data padded to zero is denoted by a character "x".

A data interval (i.e., data from 1705 to 3408) composed of 1704 samples corresponding to the 2k mode, and other data corresponding to the pull-in range present in the direction (±) of the data interval pass through a 2/4 window denoted by 407 in FIG. 3. The data of the remaining intervals is padded to zero.

In this way, a data interval from 4784 to 6487 and other data corresponding to a data interval present in the direction (±) of the data interval pass through a ¾ window denoted by 409 in FIG. 3. A data interval from 6488 to 8191 and other data corresponding to a data interval present in the direction (±) of the data interval pass through a 4/4 window denoted by 411 in FIG. 3.

The data of the remaining intervals in the data interval from 4874 to 6487 and in the data interval from 6488 to 8191 is padded to zero.

Each of the division pilot pattern generators 413, 415, 417, and 419 generates 45 pilot patterns (or 44 pilot patterns) corresponding to the 2k mode in the 8k mode.

As shown in FIG. 2, the ¼ pilot pattern generator 413 generates 45 pilot patterns (i.e., patterns from 0 to 1704) corresponding to the 2k mode from among 177 continual pilot patterns generated in the 8k mode. The remaining parts other than the 45 pilot patterns are padded to zero.

The 2/4 pilot pattern generator 415 generates 44 pilot patterns corresponding to the 2k mode, i.e., pilot patterns from 1752 to 3408, and the remaining parts other than the 44 pilot patterns are padded to zero.

In this way, the ¾ pilot pattern generator 417 generates only pilot patterns from 3456 to 5112, the 4/4 pilot pattern generator 419 generates only pilot patterns from 5160 to 6816, and the remaining pilot patterns other than the above-mentioned pilot patterns are padded to zero.

The cross-correlators 421, 423, 425, and 427 recognize position information of pilot patterns generated from the division pilot pattern generators 413, 415, 417, and 419, performs correlation between output values of the division windows 405, 407, 409, and 411 and values calculated when output values of the division windows are delayed by a single symbol, and outputs the correlation result.

In other words, each of the cross-correlators 421, 423, 425, and 427 performs cross-correlation between first data units and second data units at a predetermined position at which pilots having patterns corresponding to the 2k mode are generated, and outputs the cross-correlation result. In this case, the first data units are contained in one of four parts of the data interval having 8192 samples of the 8k mode, and the second data units are generated when the first data units are delayed by a single symbol.

Individual correlation calculation values generated from the four cross-correlators 421, 423, 425, and 427 are applied to the estimator 429.

The estimator 429 estimates a frequency offset using a single maximum value from among four division correlation maximum values.

The reason why the frequency offset is estimated using the above-mentioned method is that the method for estimating the frequency offset using the maximum value of the division correlation values has the highest reliability.

In this way, the coarse frequency offset estimation method according to the present invention divides a correlation interval of the 8k mode into 2k-mode intervals, and performs a frequency offset estimation process, such that individual phase variations are reduced, resulting in reduction of a negative influence caused by a sampling clock offset.

Therefore, the influence of the sampling clock offset is also reduced, resulting in reduction of frequency offset estimation errors.

As apparent from the above description, an apparatus and method for estimating a frequency offset according to the present invention can more correctly estimate a frequency offset even in the 8k mode, regardless of a mode.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A frequency recovery apparatus for use in a digital broadcast receiver for receiving a digital broadcast signal transmitted according to an orthogonal frequency division multiplexing (OFDM) scheme, comprising:
   a division window for dividing first data units, which are transformed from OFDM symbols into frequency-domain values and second data units which respectively correspond to the first data units delayed by time intervals respectively, and passing only parts of the data units from among data intervals of the first data units and the second data units, passing data units of a predetermined-sized data interval in the first data units and data units of a pull-in range interval positioned at front and rear parts of the predetermined-sized data interval, allowing data units of remaining intervals other than the predetermined-sized data interval and the pull-in range interval to be padded to zero, and generating a padding result;
   a pilot pattern generator for generating a pilot pattern in the divided first data units; and
   a cross-correlator for performing correlation between a part of the first data units and a part of the second data units from the division window at a individual position of the pilot pattern generated from the pilot pattern generator, and generating a correlation resultant values.

2. The frequency recovery apparatus according to claim 1, wherein the OFDM symbols are symbols in an 8k mode.

3. The frequency recovery apparatus according to claim 1, further comprising a Fast Fourier Transform unit for calculating the frequency-domain values are performed by a Fast Fourier Transform operation.

4. The frequency recovery apparatus according to claim 1, further comprising a delay for delaying the first data units by a single OFDM-symbol interval, wherein the second data units correspond to the delayed first data unit.

5. The frequency recovery apparatus according to claim 1, wherein the predetermined-sized data interval has a 2k-mode interval size.

6. The frequency recovery apparatus according to claim 1, wherein the size of one part of the pull-in range interval is 170 data units.

7. The frequency recovery apparatus according to claim 1, wherein the division window comprises four windows, each of which passes data units in the predetermined-sized data interval corresponding to a 2k-mode interval size, and data units in the pull-in range interval out of data units in an 8k-mode interval size.

8. The frequency recovery apparatus according to claim 7, wherein the pilot pattern generator comprises four pattern generators, each of which generates pilot patterns in the predetermined-sized data interval corresponding to a 2 k-mode interval size from among the data units in an 8 k-mode interval size.

9. The frequency recovery apparatus according to claim 7, wherein the cross-correlator comprises four cross-correlators, each of which performs cross-correlation between the passed first data units output from a single division window, and the second data unit, which the single division window passed at individual positions of the generated pilot patterns in the passed data output from the division window.

10. The frequency recovery apparatus according to claim 9, further comprising:
    an estimator for generating a maximum cross-correlation value from among cross-correlation values generated from the four cross-correlators.

11. A frequency recovery method for a digital broadcast signal transmitted according to an orthogonal frequency division multiplexing (OFDM) scheme, comprising the steps of:
    a) dividing first data units, which are transformed from QFDM symbols into frequency-domain values and second data units which respectively correspond to the first data units delayed by time intervals, passing only parts of the data units from among the divided data units in the divided intervals, dividing the first and the second data units into four parts each having a 2k-mode interval size, respectively, passing each part having a data interval of the 2k-mode interval size and the data units contained in a predetermined-sized pull-in range interval positioned at front and rear parts of the data interval having the 2k-mode interval size, allowing the remaining data to be padded to zero, and generating the padding result;
    b) generating pilot patterns in the divided first and second data units;
    c) performing correlation between the padding result of the first data units and the padding result of the second data units at individual positions of the generated pilot patterns, and generating correlation values; and
    d) estimating a maximum correlation value from among the correlation values as a frequency offset.

12. The frequency recovery method according to claim 11, wherein:
    the OFDM symbols in the step a) are the symbols in an 8k mode.

13. The frequency recovery method according to claim 11, wherein:
    the frequency-domain values in the step a) are calculated by a Fast Fourier Transform method.

14. The frequency recovery method according to claim 11, wherein: the second data units in the step a) are the first data units delayed by a single OFDM-symbol interval.

* * * * *